(12) United States Patent
Buzzard

(10) Patent No.: US 10,701,063 B2
(45) Date of Patent: *Jun. 30, 2020

(54) PROVIDING ACCESS TO REGISTERED-USER WEBSITE

(71) Applicant: Clear Channel Management Services, Inc., San Antonio, TX (US)

(72) Inventor: Paula Buzzard, Brooklyn, NY (US)

(73) Assignee: IHEARTMEDIA MANAGEMENT SERVICES, INC., San Antonio, TX (US)

( * ) Notice: Subject to any disclaimer, the term of this patent is extended or adjusted under 35 U.S.C. 154(b) by 755 days.

This patent is subject to a terminal disclaimer.

(21) Appl. No.: 14/319,162

(22) Filed: Jun. 30, 2014

(65) Prior Publication Data

US 2014/0317712 A1    Oct. 23, 2014

Related U.S. Application Data

(63) Continuation of application No. 12/108,441, filed on Apr. 23, 2008, now Pat. No. 8,769,652.

(51) Int. Cl.
*H04L 29/06* (2006.01)
*G06F 21/43* (2013.01)

(52) U.S. Cl.
CPC ............ *H04L 63/083* (2013.01); *G06F 21/43* (2013.01)

(58) Field of Classification Search
CPC ................................ H04L 63/083; G06F 21/43
USPC ........................................ 726/1, 2, 3, 4, 5, 6
See application file for complete search history.

(56) References Cited

U.S. PATENT DOCUMENTS

| | | | |
|---|---|---|---|
| 2002/0068554 A1 | 6/2002 | Dusse | |
| 2003/0204726 A1* | 10/2003 | Kefford | G06F 21/42 713/171 |
| 2004/0058694 A1 | 3/2004 | Mendiola et al. | |
| 2006/0259434 A1 | 11/2006 | Vilcauskas et al. | |
| 2007/0079135 A1* | 4/2007 | Saito | G06F 21/35 713/183 |
| 2007/0162566 A1 | 7/2007 | Desai et al. | |
| 2007/0244731 A1 | 10/2007 | Barhydt et al. | |

(Continued)

OTHER PUBLICATIONS

Jurrien, "Mobile MSN Content", Dec. 18, 2007, http://www.letsgomobile.org/en/2686/mobile-msn/.

*Primary Examiner* — Brandon S Hoffman
*Assistant Examiner* — Nega Woldemariam
(74) *Attorney, Agent, or Firm* — Garlick & Markison; Edward J. Marshall

(57) ABSTRACT

A first interface is transmitted from the server computer system to a user computer system, the first interface having a field for entering a mobile telephone number. A mobile phone number entered into the field for the mobile phone number is received from the user computer system at the server computer system. A password is generated and transmitting from the server computer system to a mobile device having a mobile phone number corresponding to the mobile phone number received from the user computer system and a second interface is transmitted from the server computer system to the user computer system, the second interface including a field for entering the password. A follow-up message is transmitted from the server computer system to the mobile device if the password is not received from the user computer system at the server computer system within a predetermined period of time.

20 Claims, 13 Drawing Sheets

(56) References Cited

U.S. PATENT DOCUMENTS

| | | | |
|---|---|---|---|
| 2008/0307317 A1* | 12/2008 | Yohai-Giochais | H04L 67/06 715/748 |
| 2009/0185669 A1 | 7/2009 | Zitnik et al. | |
| 2009/0222897 A1 | 9/2009 | Carow et al. | |
| 2009/0286560 A1 | 11/2009 | Willis | |
| 2010/0029249 A1 | 2/2010 | Bilstad et al. | |

* cited by examiner

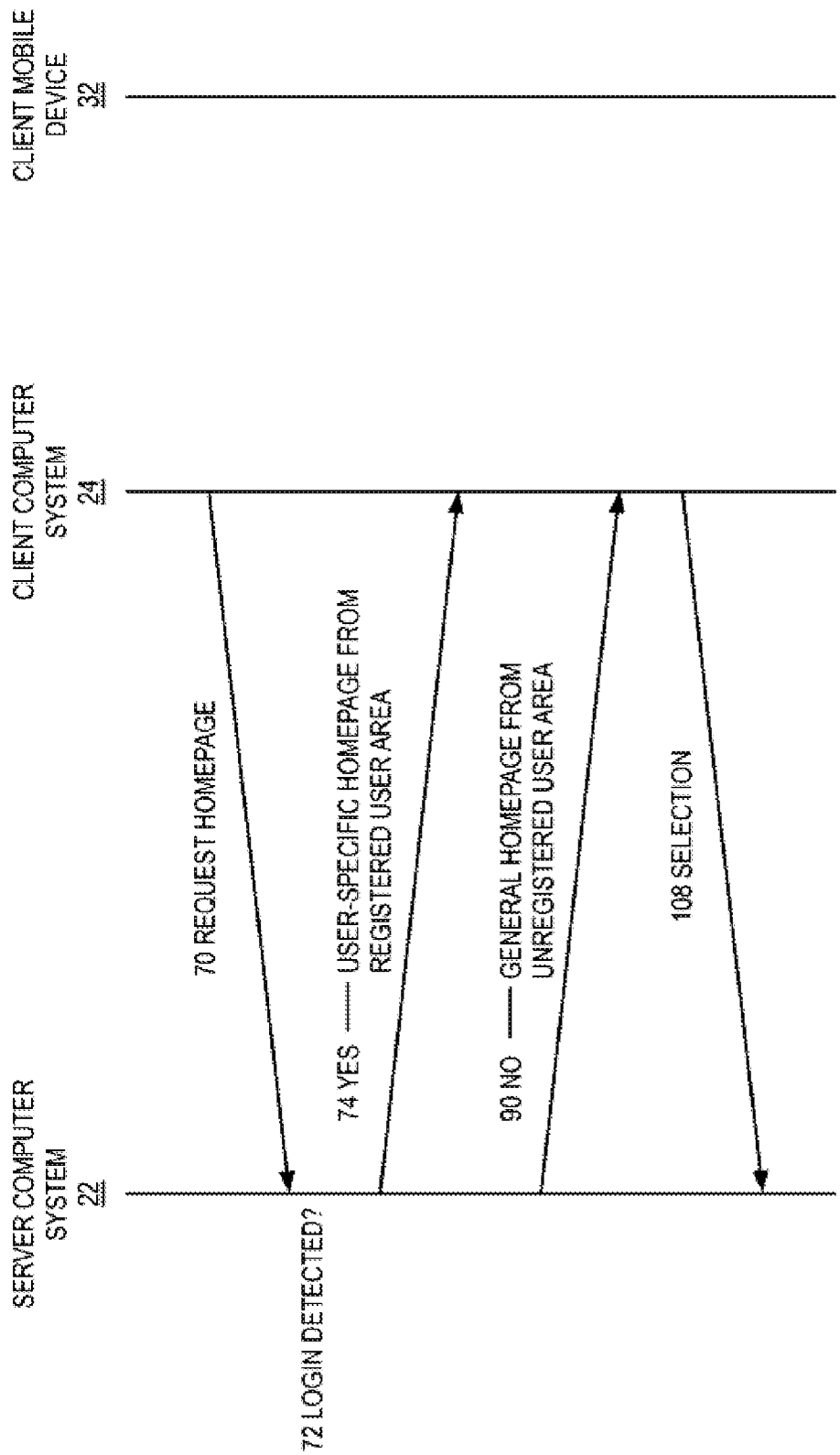

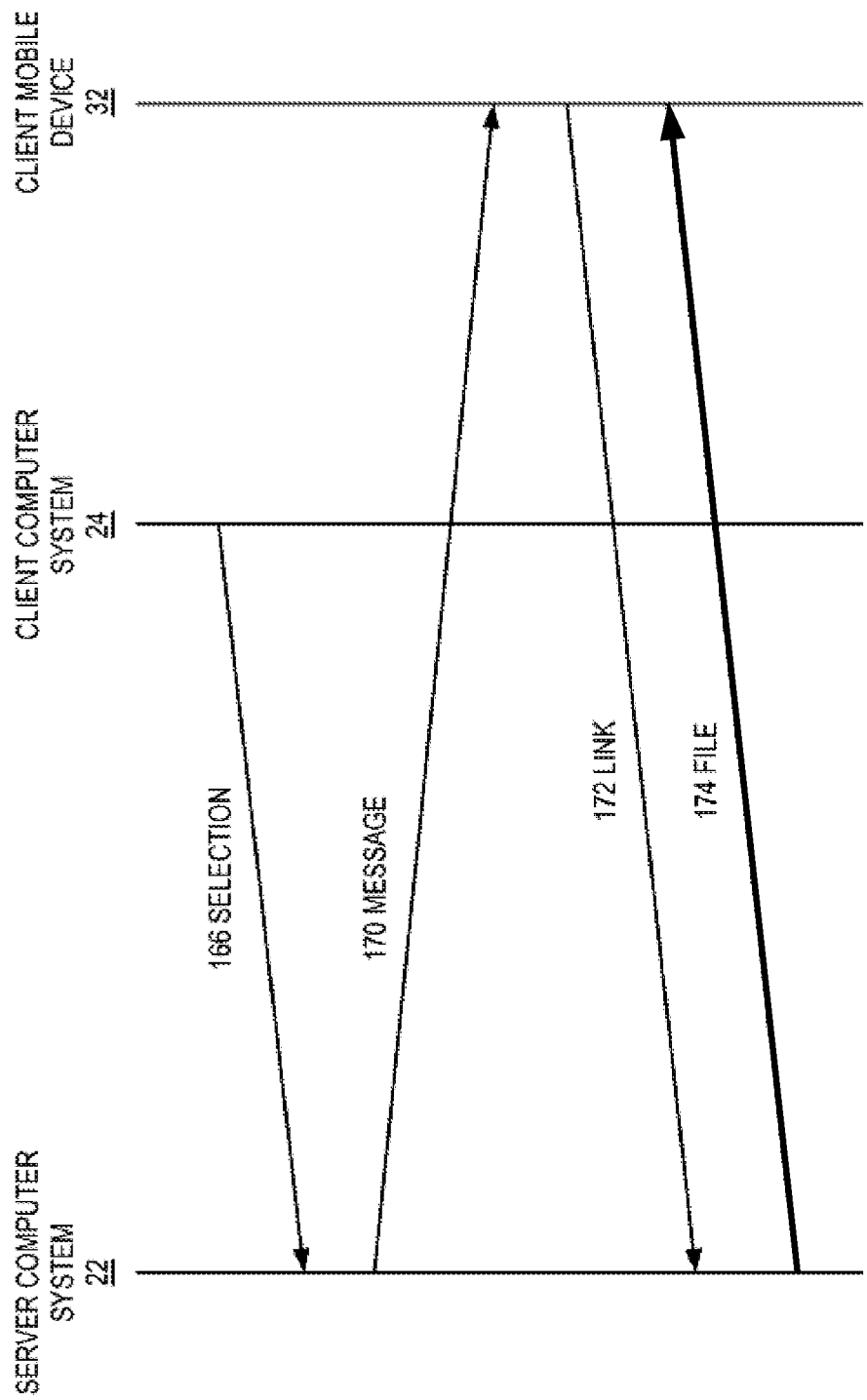

PROVIDING ACCESS TO REGISTERED-USER WEBSITE

CROSS REFERENCE TO RELATED PATENTS

The present U.S. Utility Patent Application claims priority pursuant to 35 U.S.C. § 120 as a continuation of U.S. Utility application Ser. No. 12/108,441, entitled "COMPUTER BASED METHOD AND SYSTEM FOR REGISTERING A USER AT A SERVER COMPUTER SYSTEM", filed Apr. 23, 2008, which is hereby incorporated herein by reference in its entirety and made part of the present U.S. Utility Patent Application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates to a computer-based method and system for manipulating electronic media such as ringtones and videos.

Description of Related Art

Mobile phones usually have a number of ringtones that are installed by a manufacturer. A user can select a ringtone from a drop-down list, and it is also sometimes possible to associate different ringtones with different incoming phone numbers.

A user may wish to download a ringtone from a remote server and store the ringtone in memory of the mobile phone. However, a mobile phone and the network that it is connected to are usually too slow and the viewing capabilities on the mobile phone are too limited for finding media on a remote server. A company that provides mobile media content for use on mobile phones will usually also have a website that is accessible from a user computer system over the internet. The user of the mobile phone may make use of the user computer system to find listings of mobile content on the website through browsing or searching functionality built into the website, and then instruct the website to facilitate downloading of the media content to the mobile phone. A message may, for example, be sent to the mobile phone, and the message can include a link to the media content on the server.

SUMMARY

Embodiments of the invention provide a method for registering a user at a server computer system including transmitting a first interface from the server computer system to a user computer system, the first interface having a field for entering a mobile telephone number, receiving a mobile phone number entered into the field for the mobile phone number from the user computer system at the server computer system, generating a password, transmitting the password from the server computer system to a mobile device having a mobile phone number corresponding to the mobile phone number received from the user computer system, transmitting a second interface from the server computer system to the user computer system, the second interface including a field for entering the password, and transmitting a follow-up message from the server computer system to the mobile device if the password is not received from the user computer system at the server computer system within a predetermined period of time.

The message may be in the form of an SMS message.

The message may include a link that is selectable on the mobile device, selection of the link causing a signal to be sent from the mobile device to the server computer system.

The server computer system automatically registers the user in response to the signal.

The server assigns credits associated with the user.

The method may further include, receiving the password at the sever computer system, and registering the user at the server computer system in response to receiving the password.

The password may be received within the predetermined period of time.

The password may be received after the predetermined period of time and transmission of the follow-up message.

The password may be transmitted in the form of an SMS message.

Embodiments of the invention also provide a computer-readable medium having stored thereon a set of instructions which, when executed by a processor of a computer carries out a method including, transmitting a first interface from the server computer system to a user computer system, the first interface having a field for entering a mobile telephone number, receiving a mobile phone number entered into the field for the mobile phone number from the user computer system at the server computer system, generating a password, transmitting the password from the server computer system to a mobile device having a mobile phone number corresponding to the mobile phone number received from the user computer system, transmitting a second interface from the server computer system to the user computer system, the second interface including a field for entering the password, and transmitting a follow-up message from the server computer system to the mobile device if the password is not received from the user computer system at the server computer system within a predetermined period of time.

Embodiments of the invention further provide a computer system including, a server computer system including a memory and processor connected to the memory, a database stored in the memory, the database including a plurality of registered users, a computer program stored in the memory and executable by the processor, the program including, a first interface that is transmitted to a user computer system, the first interface having a field for entering a mobile telephone number, a receiving module for receiving a mobile phone number from the user computer system, a password generating module, at least one transmission module that transmits the password to a mobile device having a mobile phone number corresponding to the mobile phone number received from the user computer system, and a second interface that is from the server computer system, the second interface having a field for entering a password, the at least one transmission module transmitting a follow-up message from the server computer system to the mobile device if the password is not received from the user computer system at the server computer system within a predetermined period of time.

BRIEF DESCRIPTION OF THE SEVERAL VIEWS OF THE DRAWING(S)

Embodiments of the invention are further described by way of example with reference to the accompanying drawings, wherein:

FIGS. 3A, 3B and 3C are interactive charts illustrating registration of a user computer system at a server computer system;

DETAILED DESCRIPTION OF THE INVENTION

Figure 1:
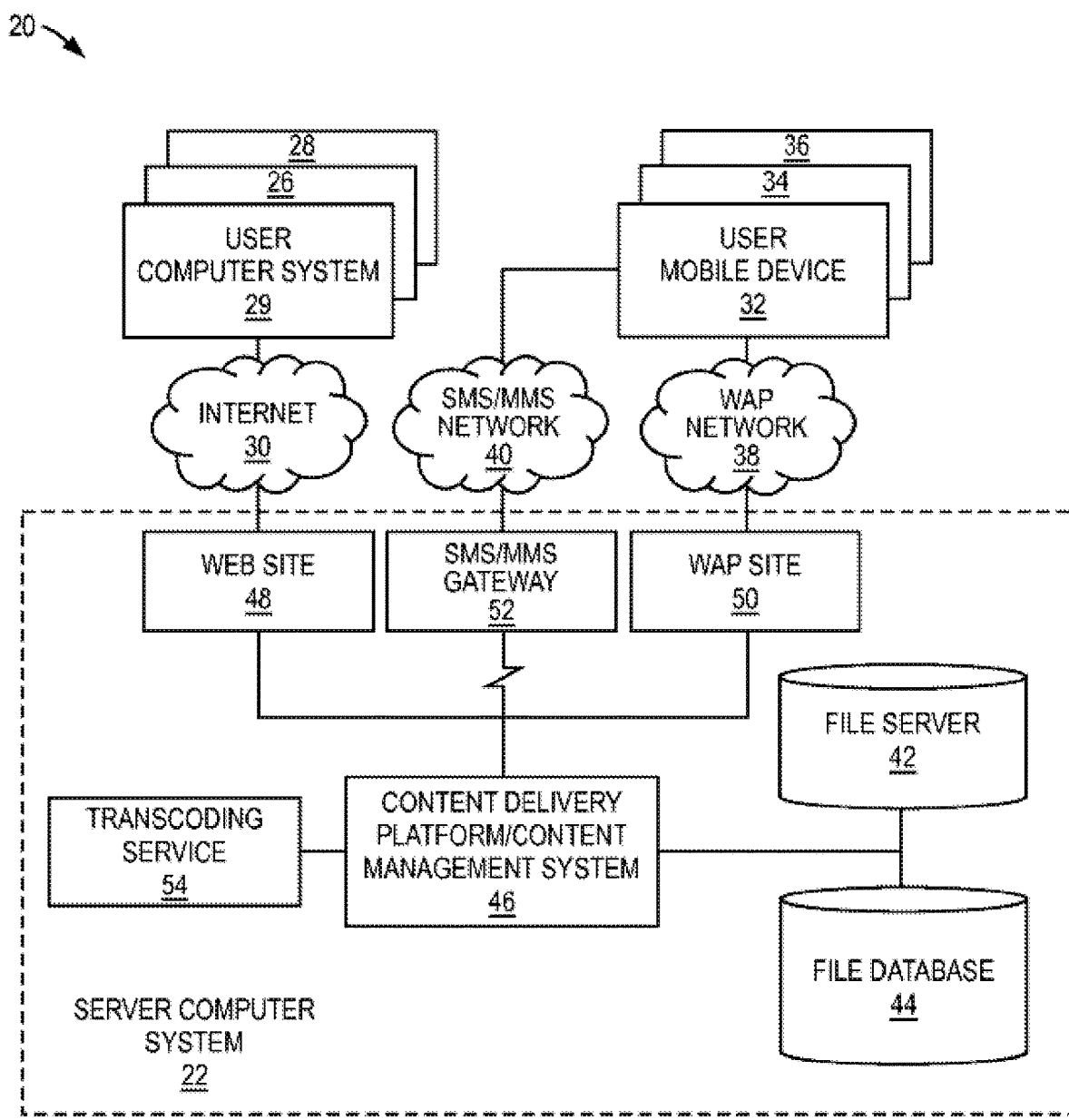
FIG. 1 is a block diagram of a network system in which principles of embodiments of the invention are manifested.

FIG. 1 of the accompanying drawings illustrates a network system 20 that embodies features of the embodiments of the invention. The network system 20 includes a server computer system 22, a plurality of user computer systems 24, 26 and 28 that are connected to the server computer system 22 over a network in the form of the Internet 30, and a plurality of user mobile devices 32, 34 and 36 that are connected over a Wide Application Protocol (WAP) network 38 and over a Short Message Service (SMS) and Multimedia Messaging Service (MMS) network 40 to the server computer system 22.

The server computer system 22 includes a file server 42, a file database 44, a content delivery platform and content management system 46, a Web site 48, a WAP site 50, an SMS/MMS gateway 52, and a transcoding service 54. The file database 44 is connected to the file server 42. The content delivery platform and content management system 46 forms the center of the server computer system 22 and all other components including the Web site 48, WAP site 50, SMS/MMS gateway 52, transcoding service 54, file server 42 and file database 44 are directly connected to the content delivery platform and content management system 46. The content delivery platform and content management system 46 indexes files from the file server 42 into the file database 44 and in a structured manner as will be required for downloading and for the Web site 48, WAP 50, SMS/MMS gateway 52, and transcoding service 54. The transcoding service 54 prepares communications suitable for transmission over the Internet 30, WAP network 38 and SMS/MMS network 40.

Figure 2:
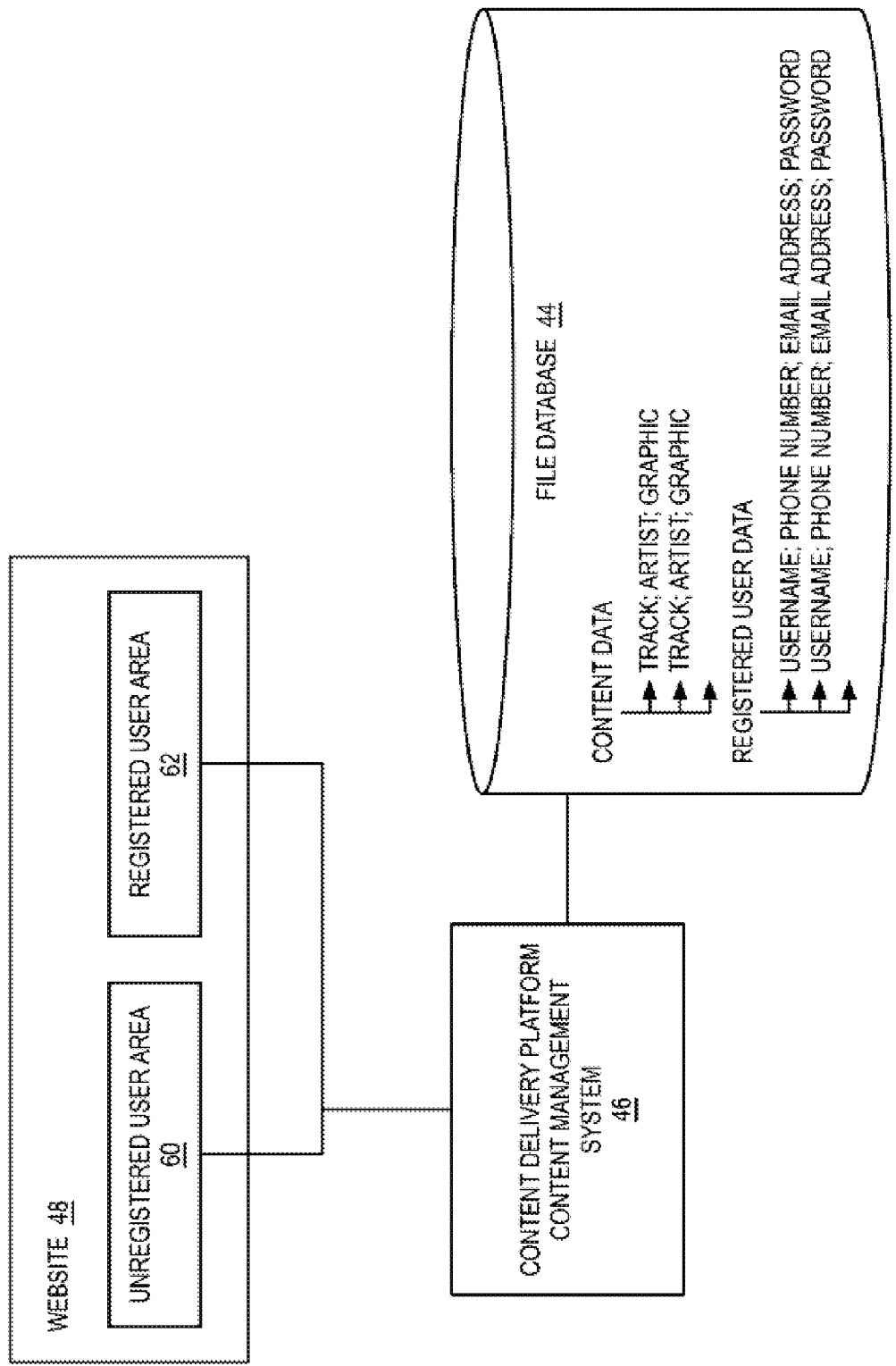
FIG. 2 is a block diagram of components of a server computer system in FIG. 1.

As shown in FIG. 2 the file database 44 includes content data and registered user data. The content data includes a plurality of tracks, each track having an associated artist and an associated graphic. Each track corresponds to a respective media file in the file database 44. The registered user data includes a plurality of user names, each with an associated phone number, email address and password.

The Web site 48 includes an unregistered user area 60 and a registered user area 62. A user at one of the user computer systems 24, 26 or 28 in FIG. 1 can log onto the Web site 48 by entering login information or by automatically transmitting a cookie to the server computer system 22. The server computer system 22 compares the login information or the cookie with registered user data in the file database 44 and, upon a favorable comparison, provides the user computer system 24, 26 or 28 access to the registered user area 62. In the event of an unfavorable comparison or if login information or a cookie is not received at the server computer system 22, the respective user computer system 24, 26 or 28 is only provided access to the unregistered area 60. A user computer system 24, 26 or 28 that is provided only access to the unregistered user area 60 can still obtain access to the registered user area 62 following completion of a registration process.

Figure 3B:
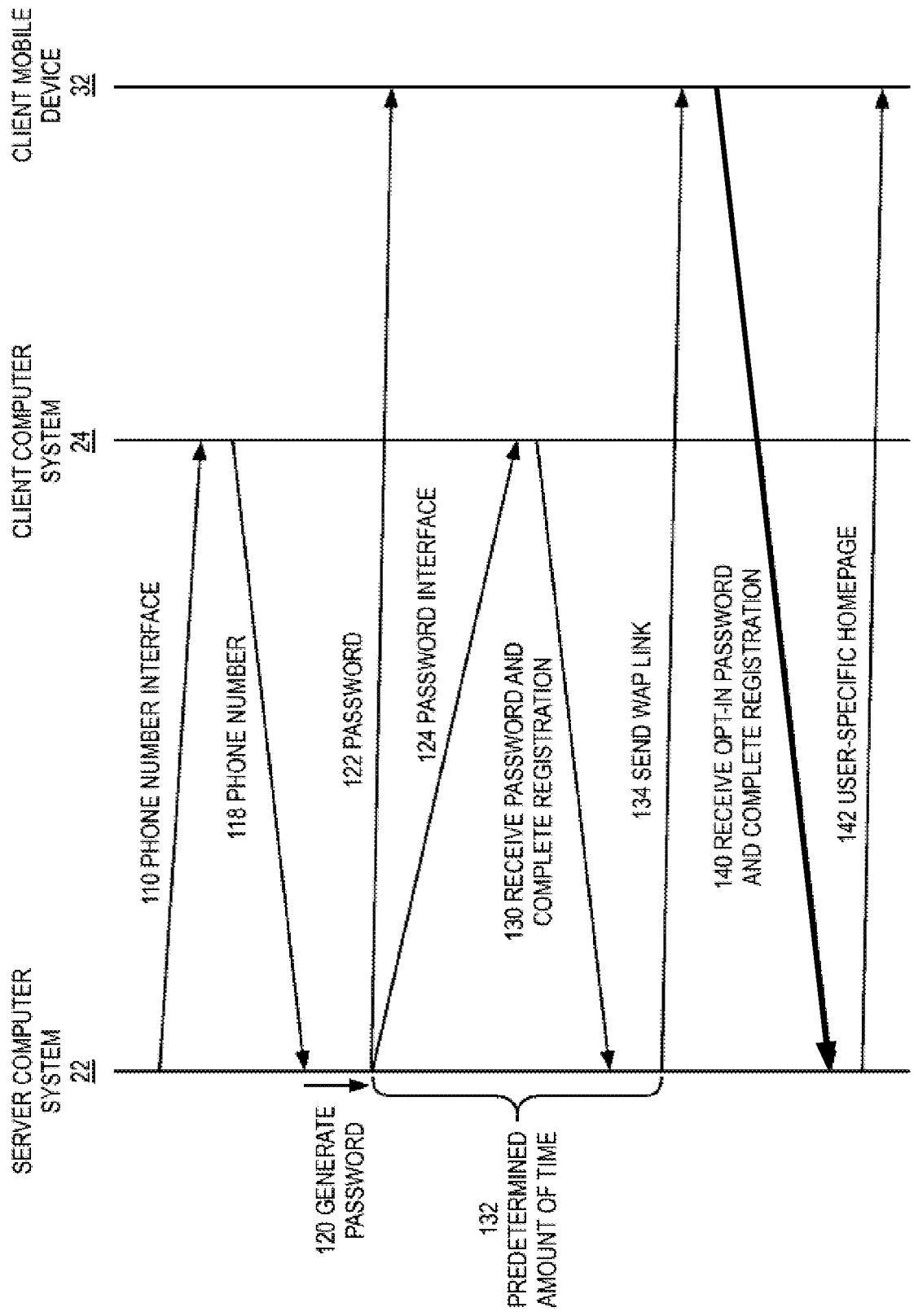

FIGS. 3A-C illustrate signals that are transmitted between the server computer system 22 in FIG. 1, one of the user computer systems 24 and one of the user mobile devices 32. The respective client computer system 24 and the respective user mobile device 32 are both under the control of the same user. At step 70, a request for a homepage is transmitted from the user computer system 24 to the server computer system 22. The homepage request is in the form of a signal that is transmitted by the user computer system 24 and then received by the server computer system 22. The signal includes an address of the server computer system 22, a request for the homepage, and a return address of the user computer system 24.

Not every signal is described in detail herein. One skilled in the art will appreciate that a signal is generated by and transmitted from one computer system and received and processed at another computer system, and will also appreciate what the contents of such a signal will be. One skilled in the art will also appreciate that a computerized step is typically carried out by a respective module of software code stored in memory of a computer. For example, a transmission step is typically carried out by a transmission module, a receiving step is carried out by a receiving module, a password generation step is carried out by a password generation module, etc. These modules are connected to one another so that a step carried out by one module can be followed by a step carried out by another module.

Should the user computer system 24 be registered at the server computer system 22, the signal will also include a cookie that serves as a login with login information of the user computer system 24 at the server computer system 22. At Step 72, the server computer system 22 determines whether a login is detected. If such a login is detected, the server computer system 22 carries out Step 74 wherein the server computer system 22 transmits a user-specific homepage from the registered user area 62 in FIG. 2 to the user computer system 24.

Figure 4:
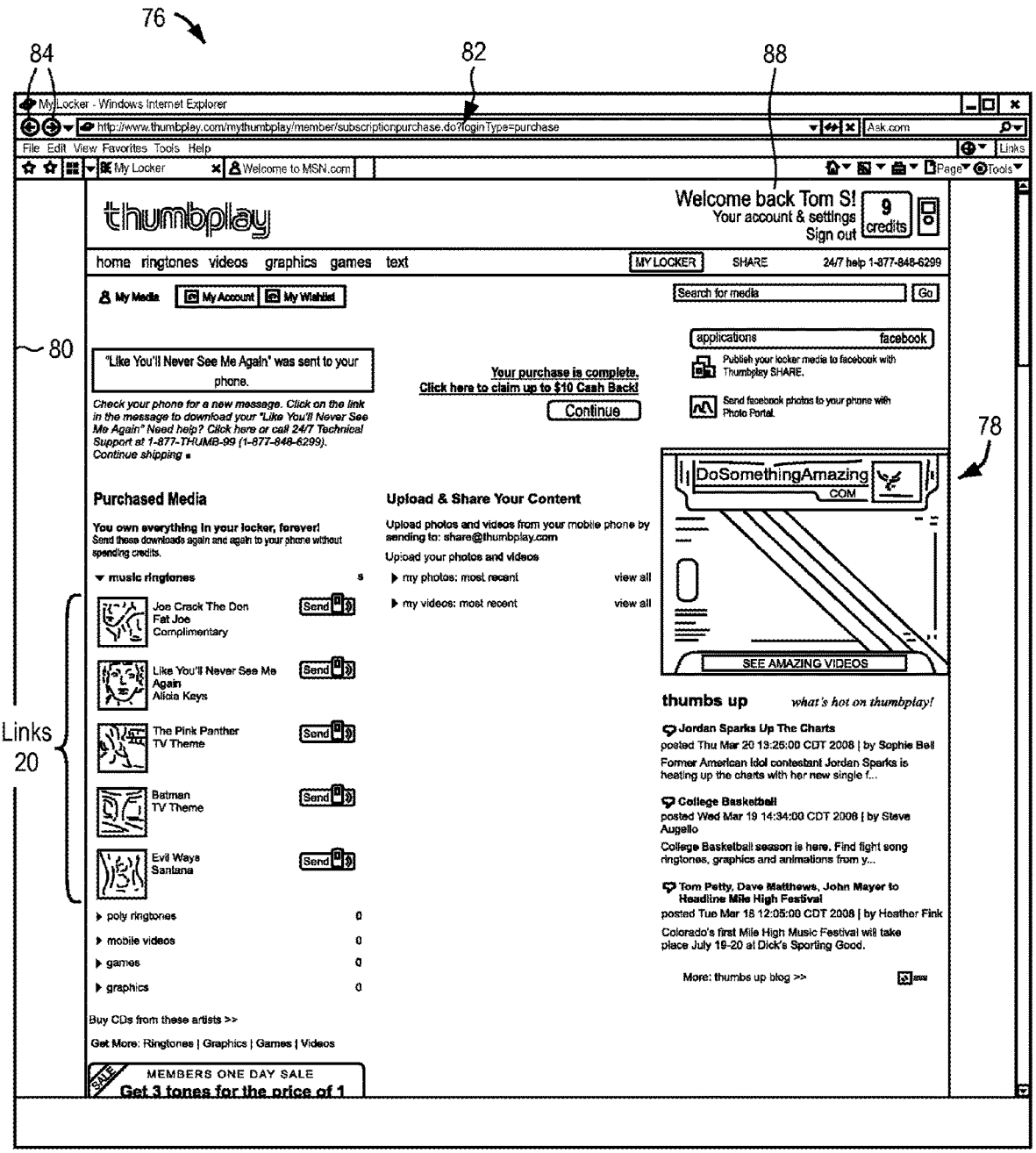
FIG. 4 is a screen shot of an Internet browser view displaying a user-specific homepage from a registered user area.

FIG. 4 illustrates a browser view 76 that displays a user-specific homepage 78 at the user computer system 24 in FIG. 1. The browser view 76 forms part of an Internet browser application such as Internet Explorer®, Netscape®, or Firefox®. The browser view 76 includes a viewing pane 80 within which the user-specific homepage 78 is displayed. The browser view 76 also has an address box 82 and "back" and "forward" buttons 84. A user can use a mouse to move a cursor 86 into the address box 82, and then depress a button on the mouse to select the address box 82. The user can then utilize a keyboard to enter text such as "http://www.thumbplay.com" in the address box 82, and can then depress an "enter" key on the keyboard to transmit the signal 70 in FIG. 3A. The "back" and "forward" buttons 84 can be selected to view earlier or subsequent pages.

Because the server computer system 22 has at Step 72 in FIG. 3A detected login information, the user-specific homepage 78 includes a username 88 from the file database 44 in FIG. 2 corresponding to the login information. The user-specific homepage 78 also includes links 90 from the file database 44 corresponding to media files that have previously been purchased by the specific user of the specific user computer system 24 and represented by the username 88. The user-specific homepage 78 also includes search and browsing functionality that allows the user of the user computer system 24 to search or find other media files for transmission to the user mobile device 32. Upon selection of such media files and instructions for downloading such media files, the media files will be transmitted to the user mobile device 32 without transmitting an intervening page from the server computer system 22 to the user computer system 24 requesting a phone number or login information such as a username or password.

Figure 5:
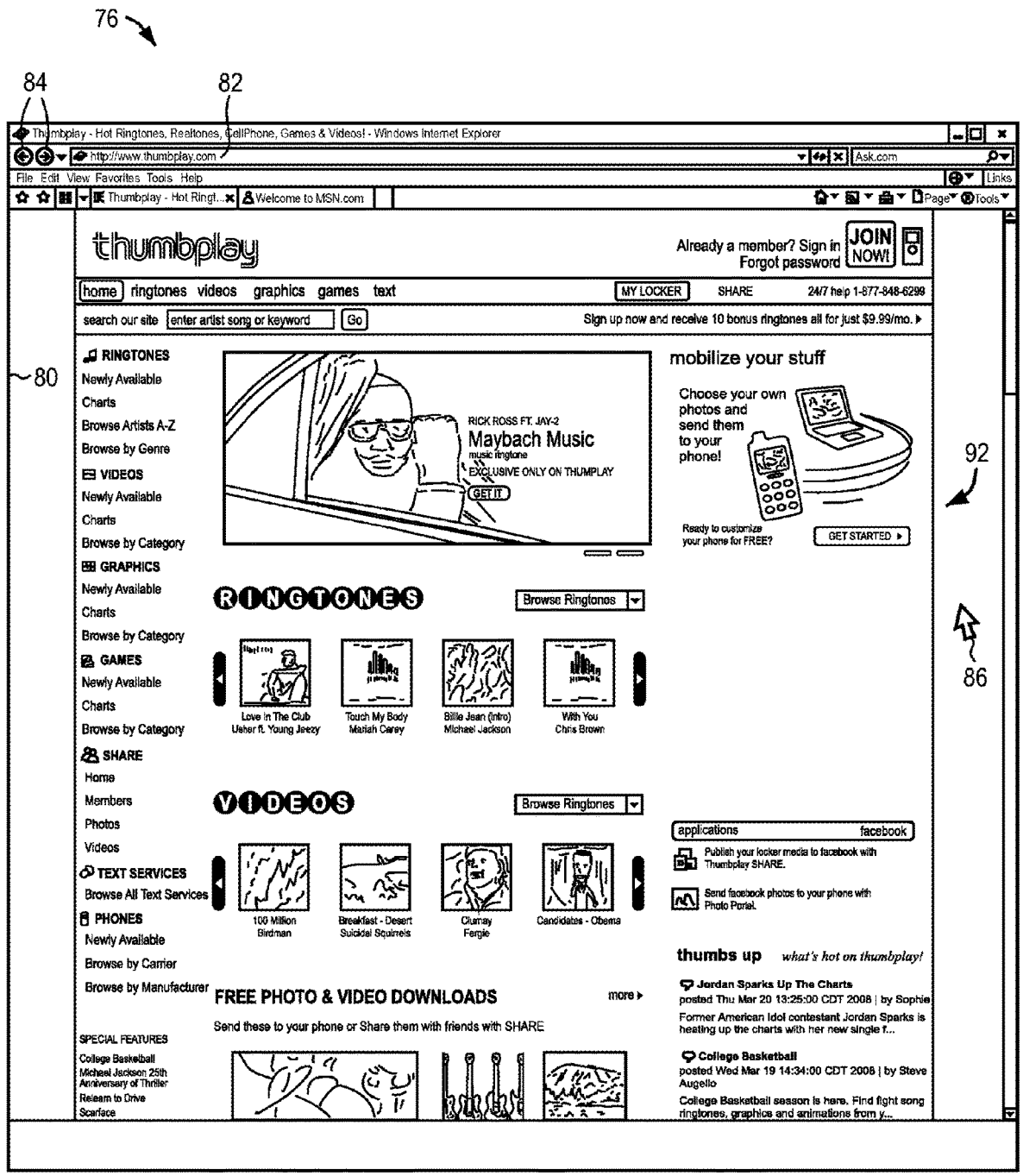
FIG. 5 is a view similar to FIG. 4 showing a general homepage from an unregistered user area.

Referring again to FIG. 3A, at Step 90, the server computer system 22 transmits a general homepage from the unregistered user area 60 in FIG. 2 to the user computer system 24 if a login is not detected at Step 72. FIG. 5 illustrates a general homepage 92 that is displayed at the user computer system 24 if a login is not detected. The general homepage 92 includes the same search and browse functionality as the user-specific homepage 78 in FIG. 4. However, the username 88 and links 90 in the user-specific homepage 78 of FIG. 4 are not displayed in the general homepage 92 of FIG. 5. A different user-specific homepage is transmitted to each user computer system from which login information is detected, but the same general homepage 92 of FIG. 5 is transmitted to all user computer systems from which login information is not received or cannot be validated.

Figure 6:
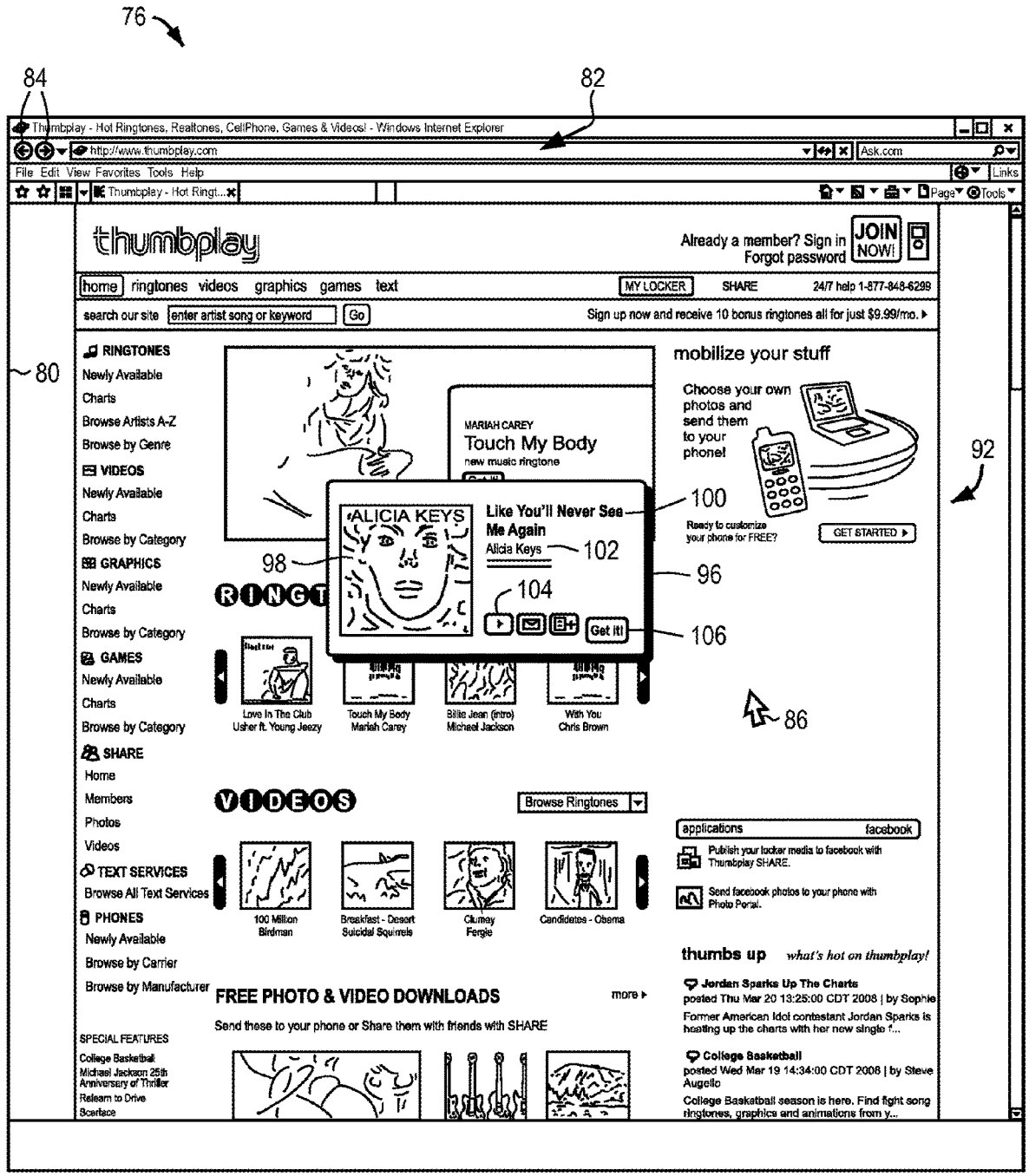
FIG. 6 is a view similar to FIG. 5 after a user has selected a link and a selection window is displayed.

FIG. 6 illustrates the general homepage 92 after a user has clicked on one of the icons on the general purpose homepage 92 to open a selection window 96. The selection window 96 includes a graphic 98, a track name 100, and an artist name 102 corresponding to one entry in the file database 44 in FIG. 1. The selection window 96 also includes a "play" button 104. The user can select the "play" button 104 so that an audio track corresponding to the entry is streamed from the file server 42 in FIG. 1 to the user computer system 24. The user can then listen to the track and decide whether or not to purchase the track.

The selection window 96 also includes a download selector 106. Because the user computer system 24 is not registered and no login information is detected at Step 72 in FIG. 3A, selection of the download selector 106 will initiate a registration process. The user will thus not be able to download the track until after completion of the registration process.

Step 108 in FIG. 3A represents a selection that is made at the user computer system 24 when clicking on the download selector 106 in FIG. 6. The selection 108 is transmitted from the user computer system 24 to the server computer system 22.

Figure 7:
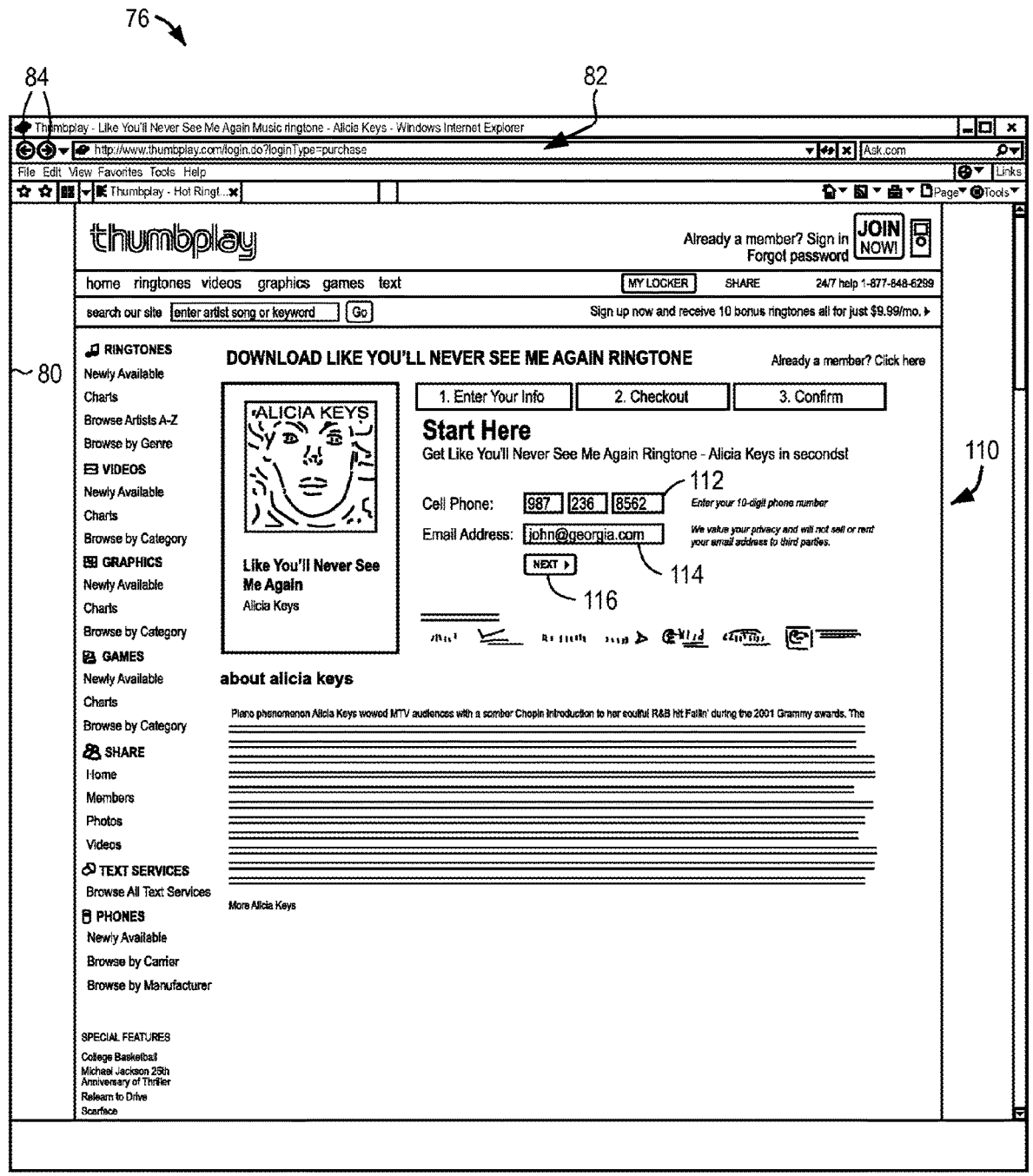
FIG. 7 is a view similar to FIG. 6 showing phone number interface.

At Step 110, the server computer system 22 automatically responds to the selection 108 by transmitting a phone number interface to the user computer system 24. FIG. 7 illustrates the phone number interface 110 in more detail. The phone number interface 110 includes fields 112 for a telephone number, a field 114 for an email address, and a "next" button 116. The user enters a phone number in the fields 112 and an email address in the field 114, and the selects the "next" button 116. At Step 118 in FIG. 3B, the user computer system 24 transmits the phone number 118 (and the email address) to the server computer system 22, upon selection of the "next" button 116 in FIG. 7.

At Step 120, the server computer system 22 generates a unique password and associates the password with the user computer system 24. Following generation of the password at Step 120, the server computer system 22 sends the password 122 to the user mobile device 32 and transmits a password interface 124 to the user computer system 24. The password 122 is transmitted in an SMS message that can be displayed at the user mobile device 32.

Figure 8:
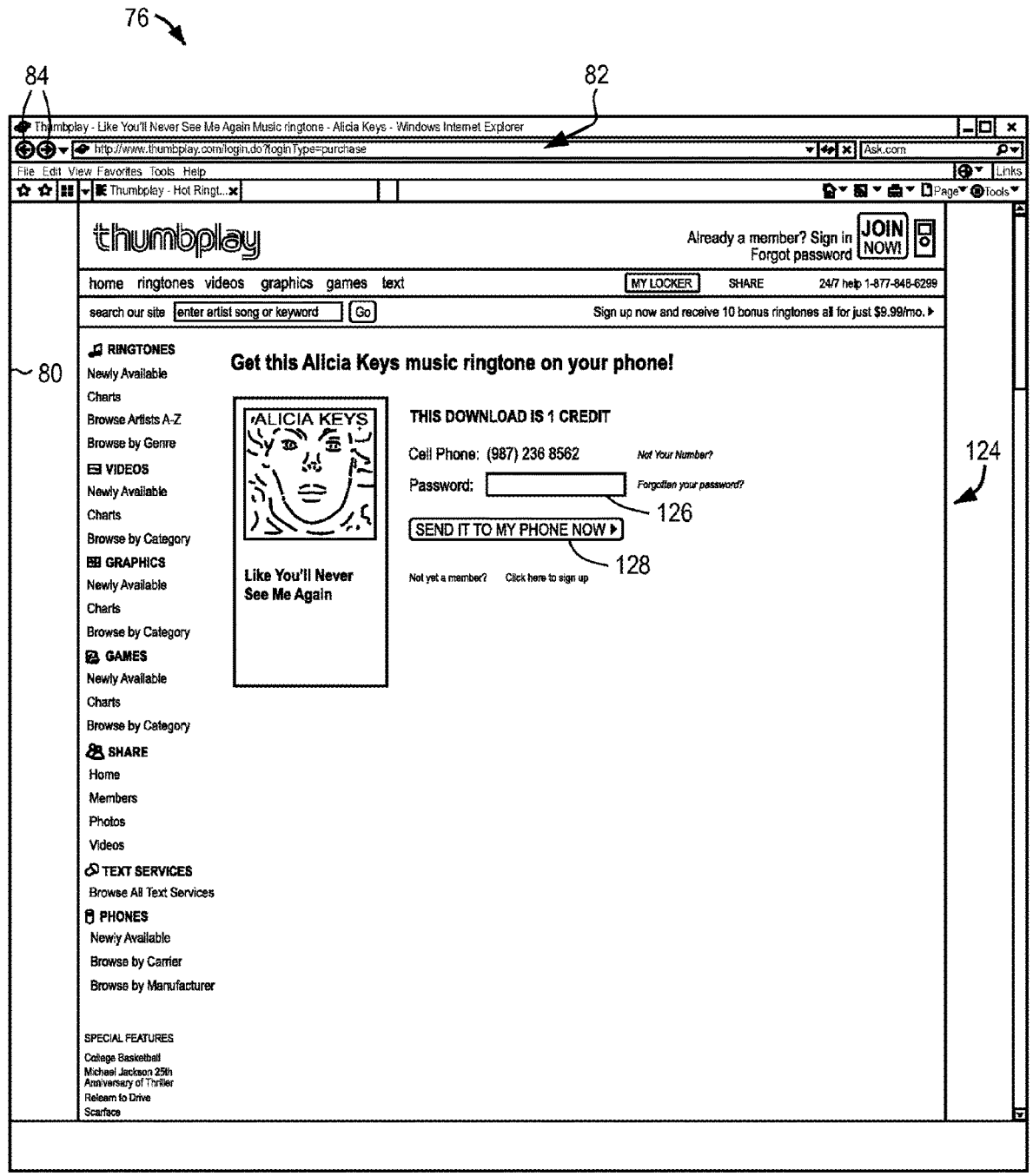
FIG. 8 is a view similar to FIG. 7 showing a password interface.

FIG. 8 shows the password interface 124 in more detail. The password interface 124 includes a password field 126 and a password transmission button 128. The user views the password 122 on the user mobile device 32 and then enters the password 122 in the password field 126. Following entry of the password 122 in the password field 126, the user selects the password transmission button 128. As shown in FIG. 3B, at Step 130, the password 122 is transmitted by the user computer system 24 and is received at the server computer system 22. The server computer system 22 then completes registration of the user computer system 24 by creating an entry in the registered user data in the file database 44 in FIG. 2 for the user computer system 24. A user-specific homepage similar to the user-specific homepage 78 in FIG. 4 will then be associated with the user computer system 24. The user computer system 24 can then be used to make purchases of media files from the file server 42 in FIG. 1.

Figure 9:
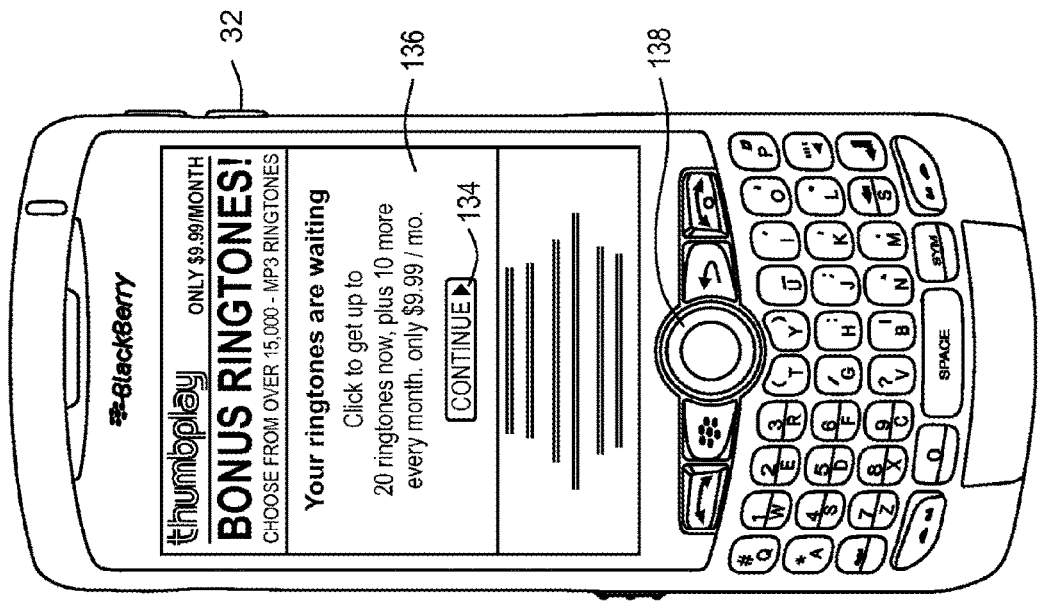
FIG. 9 is a front view of a user mobile device showing a WAP link that is displayed in an SMS message.

The server computer system 22 waits a predetermined period of time 132 to receive a password from the user computer system 24 at Step 130. If the password is not received at Step 130 within the predetermined period of time 132, the server computer system 22 sends a WAP link to the user mobile device 32 at Step 134. FIG. 9 illustrates the user mobile device 32 displaying an SMS message 136 that includes the WAP link 134. A user can use a stylus (not shown) or "arrow" and "enter" keys 138 to select the WAP link 134. Upon selection of the WAP link 134, the user mobile device 32 transmits an opt-in message to the server computer system 22, as shown at Step 140 in FIG. 3B. The server computer system 22 then completes registration of the user mobile device 32. The user mobile device 32 has been associated with the user computer system 24 by the phone number entered in FIG. 7. The server computer system 22 also completes registration of the user computer system 24 associated with the user mobile device 32.

Figure 10:
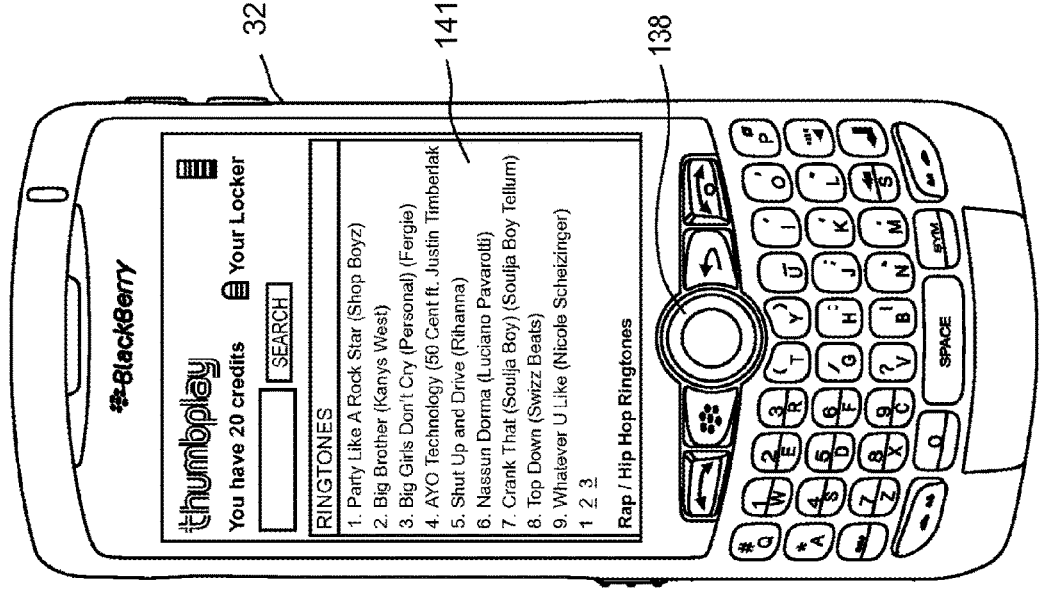
FIG. 10 is view similar to FIG. 9, wherein a user-specific homepage is displayed by the user mobile device.

At Step 142, the server computer system 22 transmits a user-specific homepage to the user mobile device 32. FIG. 10 illustrates the user-specific homepage 140 that is displayed on the user mobile device 32.

The next time the user enters the URL "http://www.thumbplay.com" in the address box 82 of the browser 76 in FIG. 5, 6, 7 or 8, the Internet Protocol (IP) address of the user computer system 24 will be detected at the server computer system 22 and the user will be presented with a user-specific homepage such as the user-specific homepage 78 in FIG. 4. It can thus be seen that the user computer system 24 is provided with a user-specific homepage from the registered user area 62 in FIG. 2 without the need for entering a password in FIG. 8.

Referring to FIG. 3C, the user can again make a selection for a particular entry at Step 166. The selection is made in a manner similar to the manner described with reference to FIG. 6 and is transmitted to the server computer system 22 upon selection of a download selector similar to the download selector 106 in FIG. 6. The server computer system 22 sends a message 170 to user mobile device 60. The message 170 is in the form of a simple SMS message that is sent over the SMS/MMS network 40 in FIG. 1. The message 170 includes a link 90 that is selectable by a user of the user mobile device 32. The user can utilize the "arrow" and "enter" keys 138 of the mobile device 32 to select the link 172. Upon selection of the link 172, the mobile device 32 transmits a requesting signal that includes the link 172 over the WAP network 38 to the content delivery platform and content management system 46. The content delivery platform and content management system 46 then extracts the media file corresponding to the selection from the file server 42 (FIGS. 1 and 2), and transmits the media file over the WAP network 38 to the user mobile device 32, as represented by Step 174 in FIG. 3C. The respective user mobile device 32 then automatically stores a copy of the selected media file in memory.

Figure 12:
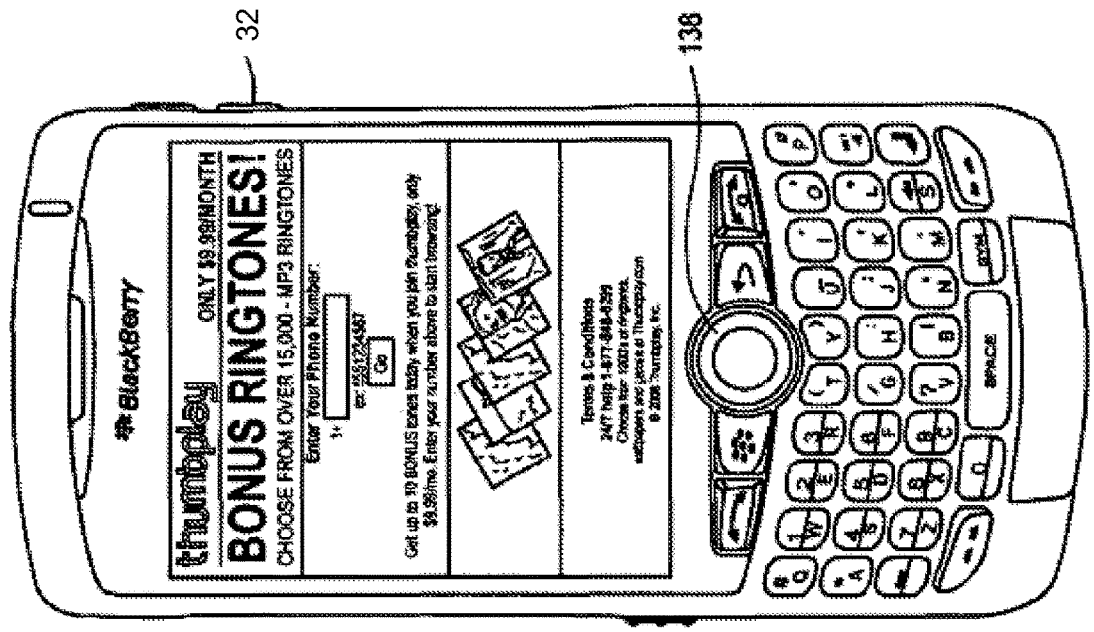
FIG. 12 is a view similar to FIG. 11 showing a phone number interface.
Figure 11:
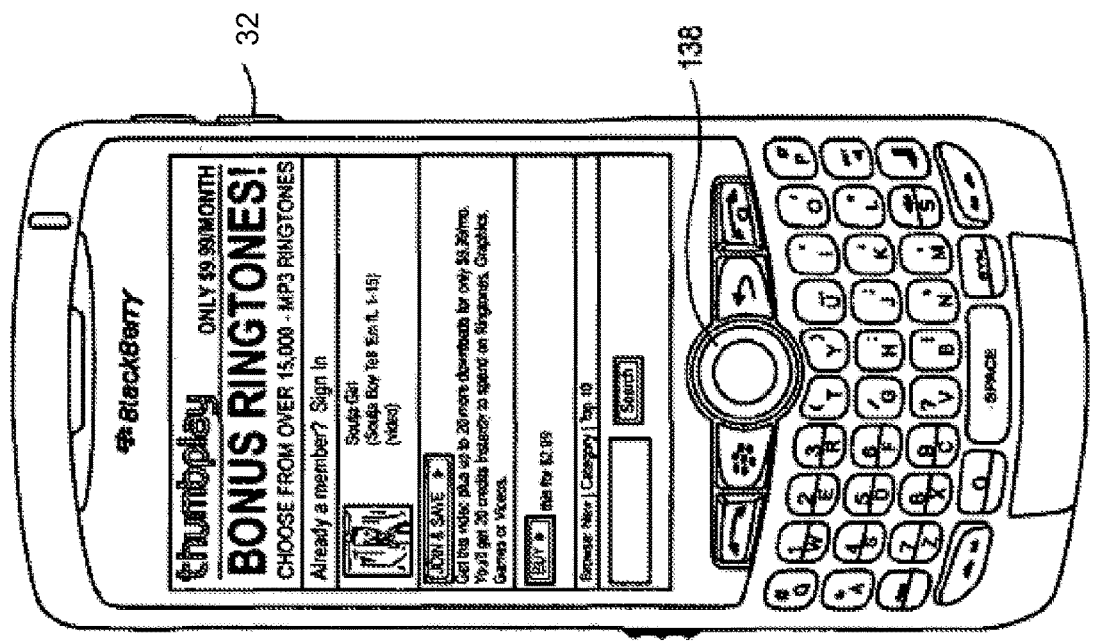
FIG. 11 shows a user mobile device with a WAP browser displaying a selection that can be made by a user when using a user mobile device instead of a user computer system to search for and find media.

Instead of using the user computer system 24 in FIG. 1 to search for and find media and then initiating the login process, the user can instead use the user mobile device 32 for the same purpose. In FIG. 3A at Step 70 where a home page is requested from the server computer system 22 by the user computer system 24, the home page will instead be requested from the user mobile device 32. Steps 74, 91, 108, 110, 118, 124, 130 and 166 that occur between the user computer system 24 and the server computer system 22 will instead occur between the user mobile device 32 and the server computer system 22. FIG. 11 for example illustrates a user mobile device 32 with a WAP browser displaying a WAP page corresponding to the home page 92 in FIG. 6. FIG. 12 illustrates a view that is similar to FIG. 11, but corresponding with the phone number interface 110 in FIG. 7.

Figure 13:
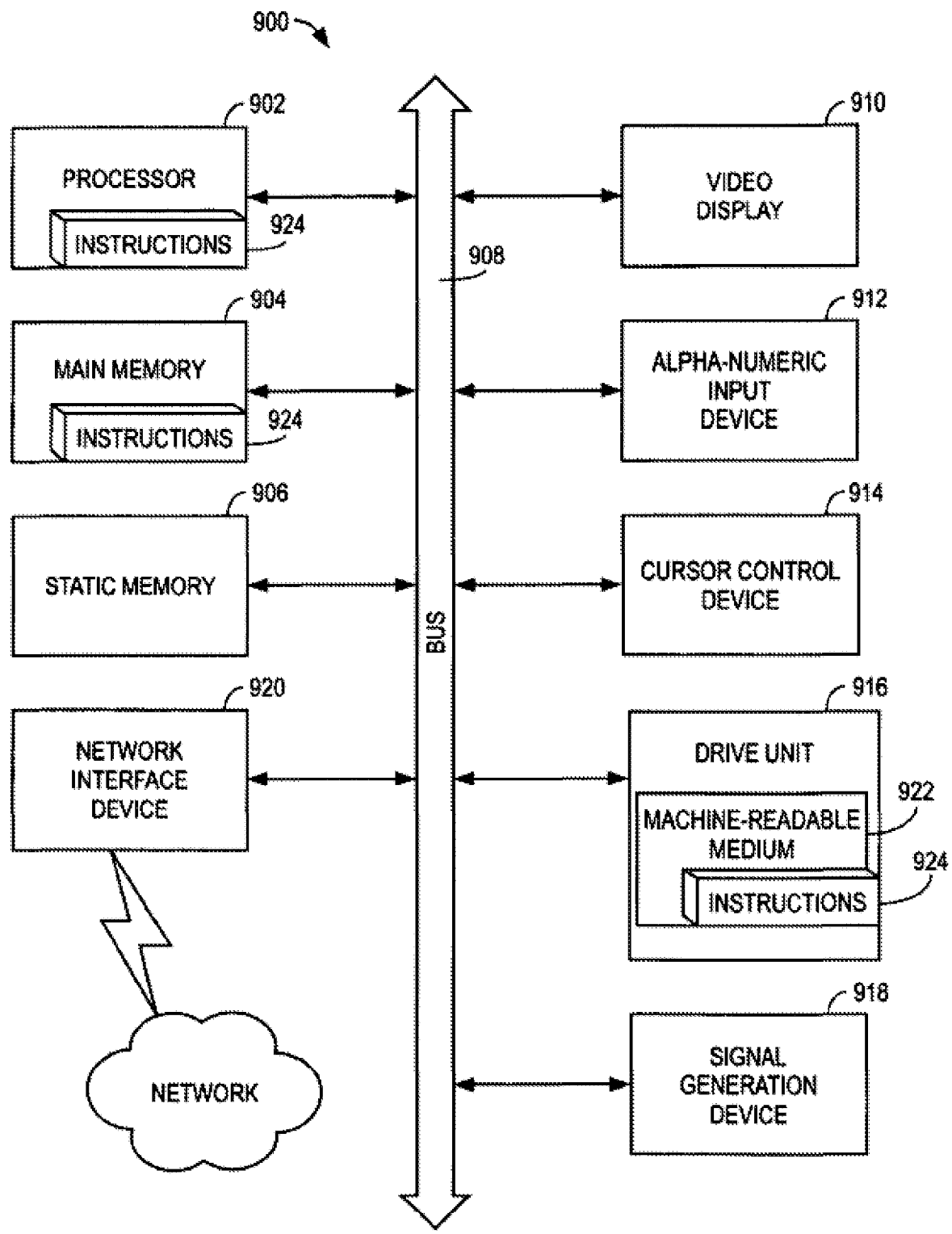
FIG. 13 is a block diagram of a machine in the form of a computer that may be used as a server computer system, user computer system or user mobile device in the network system of FIG. 1.

FIG. 13 shows a diagrammatic representation of a machine in the exemplary form of a computer system 900 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processor 902 (e.g., a central processing unit (CPU), a graphics processing unit (GPU) or both), a main memory 904 (e.g., read only memory (ROM), flash memory, dynamic random access memory (DRAM) such as synchronous DRAM (SDRAM) or Rambus DRAM (RDRAM), etc.); and a static memory 906 (e.g., flash memory, static random access memory (SRAM), etc.), which communicate with each other via a bus 908.

The computer system 900 may further include a video display 910 (e.g., a liquid crystal display (LCD) or a cathode ray tube (CRT)). The computer system 900 also includes an alpha-numeric input device 912 (e.g., a keyboard), a cursor control device 914 (e.g., a mouse), a disk drive unit 916, a signal generation device 918 (e.g., a speaker), and a network interface device 920.

The disk drive unit 916 includes a machine-readable medium 922 on which is stored one or more sets of instructions 924 (e.g., software) embodying any one or more of the methodologies or functions described herein. The software may also reside, completely or at least partially, within the main memory 904 and/or within the processor 902 during execution thereof by the computer system 900, the main memory 904 and the processor 902 also constituting machine-readable media.

The software may further be transmitted or received over a network 928 via the network interface device 920.

While the machine-readable medium 924 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the presently claimed invention. The term "machine-readable medium" shall accordingly be taken to include, but not be limited to, solid-state memories, optical and magnetic media, and carrier wave signals.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed is:

1. A computer-based method of providing access to a user-specific homepage, comprising:
    transmitting a phone number interface to a user computer in response to receiving an indication that a download selector has been activated;
    receiving, from the phone number interface, an identifier associated with a mobile device;
    transmitting a password to the mobile device associated with the identifier in response to the identifier associated with the mobile device being received from the phone number interface;
    determining whether the password transmitted to the mobile device has been used to complete registration of a user within a predetermined amount of time from transmission of the password to the mobile device;

if the password has been used to complete registration of the user within the predetermined amount of time, providing the user access to the user-specific homepage; and if the predetermined amount of time has expired prior to the password being used to complete registration of the user, transmitting a follow-up message to the mobile device.

2. The computer-based method of claim 1, wherein the password is used to complete registration by entering the password at a web page displayed on the user computer.

3. The computer-based method of claim 1, further comprising:

transmitting a short messaging service (SMS) message to the mobile device, wherein the SMS message includes a link to media content purchased via the user specific homepage.

4. The computer-based method of claim 3, wherein the media content purchased via the user specific homepage comprises a ringtone.

5. The computer-based method of claim 1, further comprising:

receiving an opt-in message from the mobile device, wherein the opt-in message is generated in response to the user selecting a link in the follow-up message; and providing the user access to the user-specific homepage in response to the opt-in message.

6. The computer based method of claim 1, further comprising:

providing the user access to a general homepage prior to completing registration, wherein the general homepage is configured to allow the user to listen to an audio track, but prevent download of the audio track.

7. The computer based method of claim 6, wherein the general homepage includes a download selector configured to initiate a registration processes in response to being selected.

8. A non-transitory computer-readable medium having stored thereon a set of instructions which, when executed by a processor of a computer carries out a method comprising:

transmitting a phone number interface to a user computer in response to receiving an indication that a download selector has been activated;

receiving, from the phone number interface, an identifier associated with a mobile device;

transmitting a password to the mobile device associated with the identifier in response to the identifier associated with the mobile device being received from the phone number interface;

determining whether the password transmitted to the mobile device has been used to complete registration of a user within a predetermined amount of time from transmission of the password to the mobile device;

if the password has been used to complete registration of the user within the predetermined amount of time, provide the user access to a user-specific homepage; and if the predetermined amount of time has expired prior to the password being used to complete registration of the user, transmit a follow-up message to the mobile device.

9. The non-transitory computer-readable medium of claim 8, wherein the password is used to complete registration by entering the password at a web page displayed on the user computer.

10. The non-transitory computer-readable medium of claim 8, wherein the method carried out by the processor further comprises:

transmitting a short messaging service (SMS) message to the mobile device, wherein the SMS message includes a link to media content purchased via the user specific homepage.

11. The non-transitory computer-readable medium of claim 10, wherein the media content purchased via the user specific homepage comprises a ringtone.

12. The non-transitory computer-readable medium of claim 8, wherein the method carried out by the processor further comprises:

receiving an opt-in message from the mobile device, wherein the opt-in message is generated in response to the user selecting a link in the follow-up message; and providing the user access to the user-specific homepage in response to the opt-in message.

13. The non-transitory computer-readable medium of claim 8, wherein the method carried out by the processor further comprises:

providing the user access to a general homepage prior to completing registration, wherein the general homepage is configured to allow the user to listen to an audio track, but prevent download of the audio track.

14. The non-transitory computer-readable medium of claim 13, wherein the general homepage includes a download selector configured to initiate a registration processes in response to being selected.

15. A computer system comprising:

a memory and a processor connected to the memory;

a computer program stored in the memory and executable by the processor, wherein the computer program is configured to register and provide access to registered-user website content, the computer program including:

at least one instruction to transmit a phone number interface to a user computer in response to receiving an indication that a download selector has been activated;

at least one instruction to receive, from the phone number interface, an identifier associated with a mobile device;

at least one instruction to transmit a password to the mobile device associated with the identifier in response to the identifier associated with the mobile device being received from the phone number interface;

at least one instruction to determine whether the password transmitted to the mobile device has been used to complete registration of a user within a predetermined amount of time from transmission of the password to the mobile device;

at least one instruction to provide the user access to a user-specific homepage if the password has been used to complete registration of the user within the predetermined amount of time; and at least one instruction to, transmit a follow-up message to the mobile device if the predetermined amount of time has expired prior to the password being used to complete registration of the user.

16. The computer system of claim 15, wherein the password is used to complete registration by entering the password at a web page displayed on the user computer.

17. The computer system of claim 15, further comprising:

at least one instruction to transmit a short messaging service (SMS) message to the mobile device, wherein the SMS message includes a link to media content purchased via the user specific homepage.

18. The computer system of claim 15, further comprising:
at least one instruction to receive an opt-in message from the mobile device, wherein the opt-in message is generated in response to the user selecting a link in the follow-up message; and
at least one instruction to provide the user access to the user-specific homepage in response to the opt-in message.

19. The computer system of claim 15, further comprising:
at least one instruction to provide the user access to a general homepage prior to completing registration, wherein the general homepage is configured to allow the user to listen to an audio track, but prevent download of the audio track.

20. The computer system of claim 19, wherein the general homepage includes a download selector configured to initiate a registration processes in response to being selected.

* * * * *